United States Patent [19]

Bondesson et al.

[11] 3,846,445
[45] Nov. 5, 1974

[54] DIBENZOFURANYLOXY AND CARBAZOLYLOYX ALKANOIC ACIDS AND ESTERS

[75] Inventors: Ulf Göran Bondesson, Orrvagen; Lars Anders Fritz Carlson, Stora Malmagatan; Christina Hedbom, Karlslundsgatan; Harry Olof Magnusson, Satterstavagen; Nils Erik Stjernström, Tappgatan, all of Sweden

[73] Assignee: Astra Lakemedel Aktiebolag, Sodertalje, Sweden

[22] Filed: Sept. 25, 1972

[21] Appl. No.: 292,138

[30] Foreign Application Priority Data
Sept. 23, 1971 Sweden.............................. 12075/71

[52] U.S. Cl......... 260/315, 260/346.2 M, 260/487, 260/633, 424/274, 424/285
[51] Int. Cl............................................ C07d 27/68
[58] Field of Search ..................... 260/315, 346.2 M

[56] References Cited
UNITED STATES PATENTS
3,784,602   1/1974   Frei et al...................... 260/346.2 M FOREIGN PATENTS OR APPLICATIONS
1,948,373   4/1970   Germany
764,536   9/1971   Belgium OTHER PUBLICATIONS
C.A., 61: 8225 f, (1964), Zawadowska.
C.A., 69: : 67041 g, (1968), Csiba et al.

*Primary Examiner*—Henry R. Jiles
*Assistant Examiner*—S. D. Winters
*Attorney, Agent, or Firm*—Brumbaugh, Graves, Donohue & Raymond

[57] ABSTRACT

Compounds of the general formula

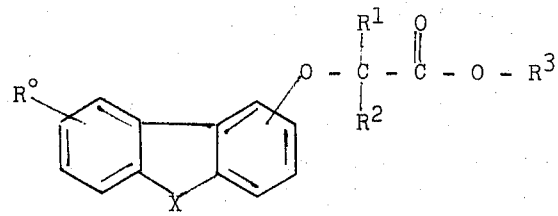

and pharmaceutically acceptable salts thereof, wherein X is —O— or —NH—; $R^0$ is H, F, Cl, Br or $OCH_3$; $R^1$ and $R^2$ are the same or different and selected from the group consisting of H and alkyl groups having 1–3 carbon atoms; $R^3$ is H or an alkyl group having 1–3 carbon atoms; $R^0$ and the side-chain containing the radicals $R^1$, $R^2$ and $R^3$ being placed on the same or different benzene ring. Pharmaceutical preparations containing these compounds are useful in a method for lowering the serum lipid concentration in mammals, including man. These same preparations are also useful for the combined lowering of serum cholesterol and triglyceride concentrations.

22 Claims, No Drawings

DIBENZOFURANYLOXY AND CARBAZOLYLOYX ALKANOIC ACIDS AND ESTERS

The present invention relates to compounds having valuable therapeutic properties, and therapeutically acceptable salts thereof. The invention also relates to methods for the preparation of the compounds, to pharmaceutical preparations containing them and to a method for the treatment of certain diseases by administering a therapeutically effective amount of a compound of the invention in association with a pharmaceutically acceptable carrier.

In view of accumulating evidence indicating that excessive serum lipid concentration is correlated to basic pathogenetic mechanisms and to symptoms of several diseases such as vascular diseases, diabetes mellitus, and hyperthyrodism, lowering or serum lipid concentration is important during treatment of such diseases.

A compound used for the treatment of hyperlipaemia is ethyl-α-(p-chlorophenoxy) isobutyrate which compound is also named Atromidin. This compound, however, suffers from the disadvantage of giving only a minor decrease of the cholesterol concentration. Pharmaceuticals with ability to decrease cholesterol levels are known but because of the possible complications involved in simultaneous administration of two different drugs it is of great advantage to use a compound with the ability to give a combined lowering of both cholesterol and triglyceride concentration.

According to the present invention it has surprisingly been found, that compounds of the general formula

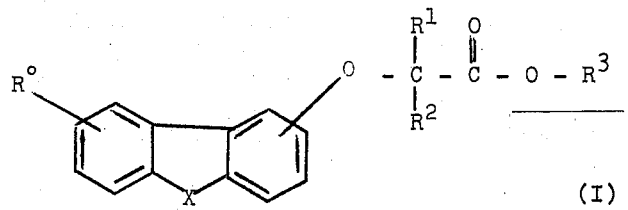

and pharmaceutically acceptable salts thereof, in which formula X is selected from the group consisting of the bivalent radicals —O— and —NH—; $R^0$ is selected from the group consisting of H, F, Cl, Br and $OCH_3$; $R^1$ and $R^2$ are the same or different and selected from the group consisting of H and an alkyl group with 1–3 carbon atoms; $R^3$ is selected from the group consisting of H and an alkyl group with 1–3 carbon atoms; $R^0$ and the side-chain containing the radicals $R^1$, $R^2$ and $R^3$ being placed on the same or different benzene ring; can be used for the combined lowering of both cholesterol and triglyceride concentrations. Biological test results indicate furthermore that these compounds have a very low toxicity. Some of the compounds according to the invention can exist as optical isomers, which optical forms constitute a further aspect of the invention. In the formula I above, X is preferably —O—, $R^0$ is preferably H, $R^1$ and $R^2$ are preferably methyl groups and $R^3$ is preferably H or an ethyl group. The preferred compound according to the invention is ethyl 2-(4-dibenzofuranyloxy)-2-methylpropionate.

The way of indicating the position of $R^0$ and the side-chain, containing the radicals $R^1$, $R^2$ and $R^3$, in the formula I above is to designate that these two groups may be placed at any of the eight possible positions of the two benzene rings.

If the radical X in formula I represents —O—, the numbering of the ring system is

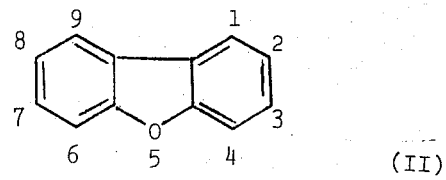

If, on the other hand, X represents —NH—, the numbering is

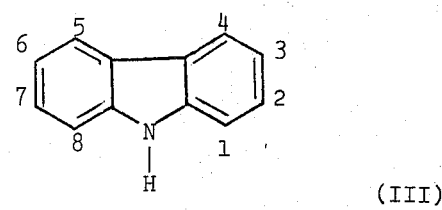

which should be kept in mind when considering the denomination of the compounds described in this specification.

The preferred position of the side-chain containing the radicals $R^1$, $R^2$ and $R^3$ in formula I is position No. 4 (or the equivalent position No. 6) when X is —O—.

The compounds according to the invention may be prepared by known methods such as a. by reacting a compound of the general formula

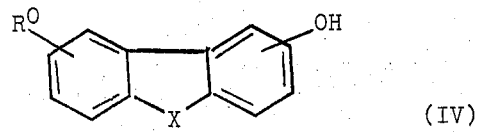

wherein $R^0$ and X have the meaning given above, $R^0$ and the hydroxyl group being placed on the same or different benzene ring, with a compound of the general formula

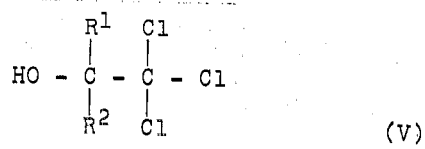

wherein $R^1$ and $R^2$ have the meaning given above, in the presence of a hydrolyzing agent such as KOH, NaOH, NaH or $NaOC_2H_5$, preferably KOH; thereafter, the resulting intermediate compound of the formula

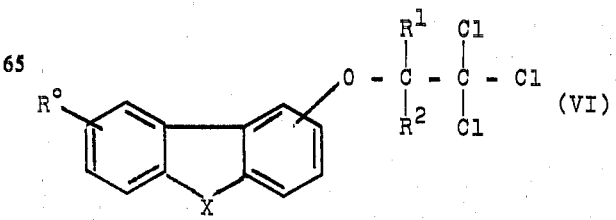

is converted by continued hydrolysis to an acid of the formula

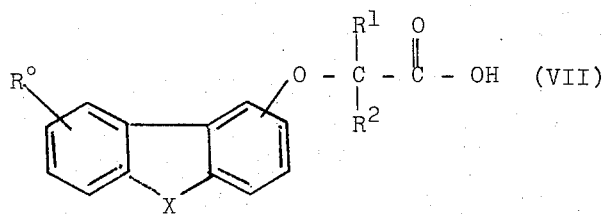

which, by methods known per se, and if desired, is converted to an alkyl ester, and b. on reacting a compound of the general formula

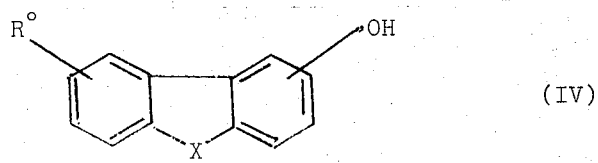

wherein $R^0$ and X have the meaning given above, $R^0$ and the hydroxyl group being placed on the same or different benzene ring, with a compound of the general formula

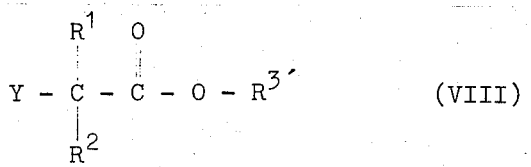

wherein Y is selected from the group consisting of Cl, Br and I; $R^1$ and $R^2$ have the meaning given above and $R^{3'}$ is selected from the group consisting of an alkyl group with 1–3 carbon atoms; in the presence of a hydrolyzing agent such as KOH, NaOH, NaH or $NaOC_2H_5$, preferably $NaOC_2H_5$, and thereafter the so obtained alkyl ester, if desired, is converted, by methods known per se, to the corresponding acid.

The reactions according to either *a* or *b* above are preferably conducted in organic solvents such as ethanol, acetone, or the like.

The product obtained from either *a* or *b* may optionally, in cases when $R^1$ and $R^2$ are different, by methods known per se, be separated into its optical antipodes and/or by methods known per se, be converted to a pharmaceutically acceptable salt, by reaction with an appropriate base.

In clinical practice the compounds of the present invention will normally be administered orally or by injection in the form of a pharmaceutical preparation comprising the active ingredient in the form of the original compound or optionally in the form of a pharmaceutically acceptable salt thereof, in association with a pharmaceutically acceptable carrier which may be a solid, semi-solid or liquid diluent or an ingestible capsule, and such preparations comprise a further aspect of the invention. Usually the active substance will comprise between 0.1 and 95 percent by weight of the preparation, for example between 0.5 and 20 percent for preparations intented for injection and between 0.1 and 50 percent for preparations intended for oral administration.

To produce pharmaceutical preparations in the form of dosage units for oral application containing a compound of the invention in the form of the original compound or a pharmaceutically acceptable salt thereof, the active ingredient may be mixed with a solid, pulverulent carrier, for example lactose, saccharose, sorbitol, mannitol, a starch such as potato starch, corn starch, amylopectin, laminaria powder or citrus pulp powder, a cellulose derivative or gelatin, and also may include lubricants such as magnesium or calcium stearate or a Carbowax or other polyethylene glycol wax and compressed to form tablets or centers for dragees. If dragees are required, the centers may be coated, for example with concentrated sugar solutions which may contain gum arabic, talc and/or titanium dioxide, or alternatively with a lacquer dissolved in easily volatile organic solvents or mixtures of organic solvents. Dyestuffs can be added to these coatings, for example, to distinguish between different contents of active substance. For the preparation of soft gelatin capsules (pearl-shaped closed capsules) consisting of gelatin and, for example, glycerol, or similar closed capsules, the active substance may be admixed with a Carbowax. Hard gelatin capsules may contain granulates of the active substance with solid, pulverulent carriers such as lactose, saccharose, sorbitol, mannitol, starches (for example potato starch, corn starch or amylopectin), cellulose derivatives or gelatin, and may also include magnesium stearate or stearic acid.

Liquid preparations for oral application may be in the form of syrups or suspensions, for example solutions containing from about 0.1 percent to 20 percent by weight of active substance, sugar and a mixture of ethanol, water, glycerol, propyleneglycol and, optionally, aroma, saccharine and/or carboxymethyl cellulose as a dispersing agent.

For parenteral application by injection preparations may comprise an aqueous solution of a water soluble pharmaceutically acceptable salt of the active substance desirably in a concentration of 0.5–10 percent, and optionally also a stabilizing agent and/or buffer substance in aqueous solution. Dosage units of the solution may advantageously be enclosed in ampoules.

The dosage used is dependent on individual requirements but the administration of about 1 g of the active substance three times a day may be recommended as therapeutical treatment of hyperlipaemia.

The following examples are intended solely to illustrate the invention and should not be contrued as limiting the scope of the claims in any way.

Example 1. Preparation of 2-(1-dibenzofuranyloxy)-2-methylpropionic acid

A solution of 7.1 g 1,1,1-trichloro-2-methyl-2-propanol, prepared according to A. G. Fishburn and H. B. Watson J. Am. Pharm. Ass. 23 (1939) p. 491, in 100 ml of dry acetone was added with stirring to 7.0 g 1-hydroxydibenzofuran, prepared according to N. E. Stjernström Acta Chem. Scand. 16 (1962) p. 553, and mixed with 8.6 g potassium hydroxide over a period of one hour. Before the addition started the mixture was cooled to about 5°C and during the addition it was allowed to warm up to room temperature. The reaction mixture was stirred at room temperature for one hour and then refluxed for 3 hours. After evaporation of the solvent the residue was dissolved in water, acidified with hydrochloric acid and extracted with ether. Extraction of the etheral solution with sodium bicarbonate solution, acidification with hydrochloric acid and extraction of the aqueous phase with ether gave 7.4 g (72 percent) crystalline product. Recrystallization from aqueous ethanol and treatment with charcoal gave a white product, m.p. 138°–140°C. The structure was confirmed by IR and NMR spectroscopy. Equivalent weight: Found: 277; Calculated for $C_{16}H_{14}O_4$: 270.3.

The following compounds were prepared in the same way giving 80–90 percent yields of crude products. The structures were confirmed by IR and NMR spectroscopy and melting points were determined after recrystallization from aqueous ethanol and treatment with charcoal.

2-(2-dibenzofuranyloxy)-2-methylpropionic acid
from 2-hydroxy-dibenzofuran, purchased from Fluka AG
m.p. 113.5°–115.0°C.
Analysis: Found: C 70.9; H 5.36; O 23.6 percent.
Calculated for $C_{16}H_{14}O_4$: C 71.10; H 5.22; O 23.68 percent 2-(3-dibenzofuranyloxy)-2-methylpropionic acid
from 3-hydroxy-dibenzofuran, prepared according to H. Erdtman, F. Haglid and N. E. Stjernström Acta. Chem. Scand. 15 (1961) p. 1761, m.p. 104.0°–106.5°C.
Equivalent weight: Found: 276.8; Calculated for $C_{16}H_{14}O_4$: 270.3.

2-(4-dibenzofuranyloxy)-2-methylpropionic acid
from 4-hydroxy-dibenzofuran, prepared according to H. Gilman, L. C. Cheney and H. B. Willis J. Am. Chem. Soc. 61 (1939) p. 951, m.p. 125.0°–127.0°C
Analysis: Found: C 70.6; H 5.27; O 23.9 percent.
Calculated for $C_{16}H_{14}O_4$: C 71.10; H 5.22; O 23.68 percent.

2-(2-carbazolyloxy)-2-methylpropionic acid
from 2-hydroxycarbazole, prepared according to H. Erdtman, F. Haglid and N. E. Stjernström Acta Chem. Scand. 15 (1961) p. 1761. The yield of crude product was 60 percent. M.p. 190°–191°C.
Equivalent weight: Found 271; Calculated for $C_{16}H_{15}NO_3$: 269.3.

Example 2. Preparation of ethyl 2-(1-dibenzofuranyloxy)-2-methylpropionate 2-(1-dibenzofuranyloxy)-2-methylpropionic acid (6.7 g) was refluxed in 250 ml of ethanol saturated with hydrogen chloride for 4 hours. After evaporation of the solvent the resulting 6.6 g of dark oil were distilled to give 5.4 g (72 percent) of a slightly yellow oil, b.p. 156°–158°C/0.06 mm Hg, m.p. 74°–77°C. Analysis: Found: C 72.4; H 6.18; O 21.3 percent. Calculated for $C_{18}H_{18}O_4$: C 72.47; H 6.08; O 21.45 percent.

In an analogous way the following esters were prepared:

Ethyl 2-(2-dibenzofuranyloxy)-2-methylpropionate
Yield: 60 percent. 168°–174°C/0.1 mm Hg.
Analysis: Found: C 72.36; H 6.16; O 21.35 percent.

Calculated for $C_{18}H_{18}O_4$: C 72.47; H 6.08; O 21.45 percent.
Ethyl 2-(3-dibenzofuranyloxy)-2-methylpropionate
Yield: 80 percent. B.p. 183°–186°C/0.1 mm Hg, m.p. 45.0°–46.0°C.
Analysis: Found: C 72.4; H 5.97; O 21.5 percent.
Calculated for $C_{18}H_{18}O_4$: C 72.47; H 6.08; O 21.45 percent
Ethyl 2-(4-dibenzofuranyloxy)-2-methylpropionate
Yield: 80 percent. B.p. 150°–155°C/0.02 mm Hg, m.p. 62°–63°C.
Analysis: Found: C 72.03; H 5.92; O 22.10 percent.
Calculated for $C_{18}H_{18}O_4$: C 72.47; H 6.08; O 21.45 percent.

Ethyl 2-(2-carbazolyloxy)-2-methylpropionate
After refluxing 2-(2-carbazolyloxy)-2-methylpropionic acid in ethanol saturated with hydrogen chloride, the ethanol was evaporated and the residue extracted with saturated sodium bicarbonate solution. The ether was dried and evaporated to give a yellow crystalline product (84 percent). Repeated recrystallizations from aqueous methanol and from benzene gave a white product, m.p. 121°–123°C.
Analysis: Found: C 79.9; H 6.55; N 4.77; O 16.1 percent. Calculated for $C_{18}H_{19}NO_3$: C 72.71; H 6.44; N 4.71; O 16.14 percent.

Example 3. Preparation of 2-(6-methoxy-4-dibenzofuranyloxy)-2-methylpropionic acid and its ethyl ester a. 4-Hydroxydibenzofuran was methylated by dimethylsulphate according to H. Gilman and R. V. Young: J. Am. Chem. Soc. 57 (1935) p. 1121, to give 4-methoxydibenzofuran; m.p. 48.5°–49°C.

b. A solution of 0.35 mole n-butyllithium in hexane (160 ml) and TMEDA (75 ml; 0.50 mole) was slowly added with stirring to a solution of 4-methoxydibenzofuran (60.2 g; 0.30 mole) in 1,000 ml dry diethyl ether. The temperature of the reaction mixture was maintained between −2° and +2°C. After 20 h the reaction mixture and 0.45 mole n-butylmagnesiumbromide in diethyl ether were added to an oxygen saturated, stirred diethyl ether solution cooled by means of a dry ice-ethanol bath. Oxygen was bubbled through the stirred solution overnight. The cooling was maintained for the first 5 h. After hydrolysis, the two isomeric phenols were separated to H. Gilman, L. C. Cheney and H. B. Willis: J. Am. Chem. Soc. 61, (1939) p. 951, followed by an additional chromatographic purification. Yield of 4-hydroxy-6-methoxydibenzofuran: 17.5 percent (11.2 g); m.p. 107°–108.5°C (reported 111°–112°C). The structure was confirmed by NMR-analysis.

c. 2-(6-methoxy-4-dibenzofuranyloxy)-2-methylpropionic acid was prepared from 4-hydroxy-6-methoxydibenzofuran in analogy with the method described in Example 1. The yield of crude product was 88.5 percent. M.p. 162.5°–165.5°C. Analysis: Found: C 68.1; H 5.4; O 26.4 percent. Calculated for $C_{17}H_{16}O_5$: C 67.99; H 5.37; O 26.65 percent.

d. Ethyl 2-(6-methoxy-4-dibenzofuranyloxy)-2-methylpropionate was prepared from 2-(6-methoxy-4-dibenzofuranyloxy)-2-methylpropionic acid in analogy with the method described in Example 2. The yield of crude product was 62 percent. M.p. 76°–77°C. Analysis: Found: C 69.69; H 6.21; O 23.93 percent. Calculated for $C_{19}H_{20}O_5$: C 69.50; H 6.14; O 24.36 percent.

Example 4. Preparation of 2-(1-chloro-4-dibenzofuranlyoxy)-2-methylpropionic acid and its ethyl ester a. 4-Hydroxydibenzofuran was chlorinated in chloroform with sulfuryl chloride mainly according to H. Gilman and D. L. Esmay: J. Am. Chem. Soc. 76 (1954) p. 5,787. The refluxed period was 24 hours instead of 1.5 hours. Repeated recrystallizations from carbon tetrachloride gave white needles, m.p. 150° – 151°C (reported 154° – 155°C) in 22.8 % yield. The structure was confirmed by IR and NMR spectroscopy.

b. 2-(1-Chloro-4-dibenzofuranyloxy)-2-methylpropionic acid was prepared from 1-chloro-4-hydroxydibenzofuran in analogy with the method described in Example 1. The yield of crude product was 97.5 percent. Recrystallization from ligroin gave a faint yellow product, m.p. 106° – 107°C. The structure was confirmed by IR and NMR spectroscopy.

c. Ethyl 2-(1-chloro-4-dibenzofuranyloxy)-2-methylpropionate was prepared from 2-(1-chloro-4-dibenzofuranyloxy)-2-methylpropionic acid in analogy with the method described in Example 2. 97 percent Yield of crude product was obtained. Recrystallization from aqueous methanol gave white crystals with m.p. 56.5° – 57.5°C. The structure was confirmed by IR and NMR spectroscopy.

Other monohalogenated compounds included in the scope of this invention can be prepared in analogy with the method described in Example 4, using the appropriate monohalogenated hydroxydibenzofuran or hydroxycarbazole as starting material. Methods for the preparation of e.g. various monochlorinated and monobrominated hydroxydibenzofurans are described by K. Oita, R. G. Johnson and H. Gilman: I. Org. Chem. 20 (1955) 657; H. Gilman and P. R. Van Ess: J. Am. Chem. Soc. 61 (1939) 1365 and K. Schimmelschmidt: Ann 566 (1950) 184 – 206.

Example 5. Preparation of ethyl 4-dibenzofuranyloxyacetate

Metallic sodium (0.58 g; 0.025 mole) was added to 200 ml super dry ethanol. When the reaction had ceased 4.6 g (0.025 mole) of 4-hydroxydibenzofuran and 5.0 g (0.03 mole) of ethyl bromoacetate were added. The reaction mixture was refluxed for 16 hours. The solvent was then evaporated and the remaining solid dissolved in 150 ml water and 150 ml ether. The etheral layer was extracted with dilute sodiumhydroxide solution and then dried (Mg $SO_4$). 3.3 g crude product was obtained. Distillation at 1.0 mm Hg gave 2.65 g (39 percent) of a colourless oil, b.p. 238° –241°C. The oil crystallized upon cooling, m.p. 50.0° – 51.5°C. The structure was confirmed by IR and NMR spectroscopy.

Example 6. Preparation of ethyl 2-(4-dibenzofuranyloxy) propionate

This compound was prepared from 4-hydroxydibenzofuran and ethyl 2-bromopropionate in analogy with the method described in Example 5. The product was a colourless oil (43 percent yield), b.p. 170° –173°C/0.2 mm Hg, which crystallized upon cooling, m.p. 38.5° –40°C. The structure was confirmed by IR and NMR spectroscopy.

The following examples illustrate how the compound of the invention can be incorporated in pharmaceutical compositions, in which examples the active substance is exemplified by the preferred compound.

Example 7. Preparation of soft gelatine capsules 500 g of ethyl 2-(4-dibenzofuranyloxy)-2-methylpropionate were mixed with 500 g of corn oil whereafter the mixture was filled in soft gelatine capsules, each capsule containing 100 mg of the mixture (i.e., 50 mg of active substance).

Example 8. Preparation of soft gelatine capsules 500 g of ethyl 2-(4-dibenzofuranyloxy)-2-methylpropionate were mixed with 750 g of peanut oil whereafter the mixture was filled in soft gelatine capsules, each capsule containing 125 mg of the mixture (i.e., 50 mg of active substance).

Example 9. Preparation of tablets 5 kg of ethyl 2-(4-dibenzofuranyloxy)-2-methylpropionate were mixed with 2 kg of silicon dioxide of the trademark Aerosil, whereafter 4.5 kg of potato starch and 5 kg of lactose were mixed in and the mixture moistened with a starch paste prepared from 0.5 kg of potato starch and distilled water, whereafter the mixture was granulated through a sieve. The granulate was dried and sieved whereafter 0.2 kg of magnesium stearate were mixed in. Finally the mixture was pressed into tablets, each weighing 172 mg.

Example 10. Preparation of an emulsion 100 g of ethyl 2-(4-dibenzofuranyloxy)-2-methylpropionate were dissolved in 2,500 g of peanut oil. From the solution thus obtained, 90 g of Gun Arabic, aroma and color (q.s.) and 2,500 g of water an emulsion was prepared.

Example 11. Preparation of a syrup 100 g of ethyl 2-(4-dibenzofuranyloxy)-2-methylpropionate were dissolved in 300 g of 95 percent ethanol where 300 g of glycerol, aroma and color (q.s.) and water 1,000 ml were mixed in. A syrup was thus obtained.

Example 12. Preparation of a solution 100 g of ethyl 2-(4-dibenzofuranyloxy)-2-methylpropionate were dissolved in 2,000 g of polyoxyethylene sorbitan monooleate, whereafter aroma and color (q.s.) and water to 5,000 ml were mixed in. A drop solution was thus obtained.

Example 13. Preparation of effervescent tablets 100 g of ethyl 2-(4-dibenzofuranyloxy)-2-methylpropionate 140 g of finely divided citric acid, 110 g of finely divided sodium hydrogen carbonate, 3.5 g of magnesium stearate and aroma (q.s.) were mixed and the mixture was pressed into tablets, each containing 100 mg of active substance.

Example 14. Preparation of a drop solution 100 g of ethyl 2-(4-dibenzofuranyloxy)-2-methylpropionate were mixed with 300 g of ethanol, whereafter 300 g of glycerol, water to 1,000 ml aroma and color (q.s.) and 0.1 N sodium hydroxide solution (to pH 4.5–5.5) were added while stirring. A drop solution was thus obtained.

Example 15. Preparation of a sustained release tablet 200 g of ethyl 2-(4-dibenzofuranyloxy)-2-methylpropionate were melted together with 50 g of stearic acid and 50 g of carnauba wax. The mixture thus obtained was cooled and ground to a particle size of at most 1 mm (diameter). The mass thus obtained was mixed with 5 g of magnesium stearate and pressed into tablets each weighing 305 mg. Each tablet thus contains 200 mg of active substance.

Biological tests

A. Toxicity

The acute toxicity of the compound ethyl 2-(4-dibenzofuranyloxy)-2-methylpropionate was determined. In mice $LD_{50}$ after intravenous administration was between 0.5–1.0 g/kg.

B. Effect on the level of cholesterol and triglycerides in mouse plasma

Male mice of the N.M.R.I. strain with bodyweights of 20–22 g were fed ground mouse chow supplemented with test substances (0.3 percent w/w) for 6 days. Twelve mice forming one group were housed in the same cage. One group served as control. At the end of the experiment the mice were decapitated and blood from three mice was pooled for the determination of cholesterol and triglycerides.

Analysis of plasma lipids

Total cholesterol and triglycerides were determined by the method of Technicon for Autoanalyzer, described in Technicon Laboratory/Method File No. 24a resp. No. 78. The amount of triglycerides was determined as $\mu$ mole triglycerides per ml plasma.

Diet

The mice were fed commercial mouse chow obtained from Astra-Ewos, Sodertalje, Sweden. A control group of mice received mouse chow with no addition of active compounds. The results are collected in Table 1 below, in which table compound No.

1 is ethyl 2-(1-dibenzofuranyloxy)-2-methylpropionate 2 is ethyl 2-(2-dibenzofuranyloxy)-2-methylpropionate 3 is ethyl 2-(3-dibenzofuranyloxy)-2-methylpropionate 4 is ethyl 2-(4-dibenzofuranyloxy)-2-methylpropionate 5 is ethyl 2-(2-carbazolyloxy)-2-methylpropionate
6 is ethyl 2-(6-methoxy-4-dibenzofuranyloxy)-2-methylpropionate.

Atromidin ® is a compound of the formula

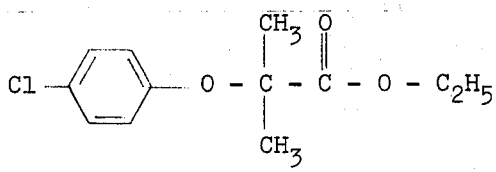

which is clinically used as a serum lipid lowering drug.

All compounds reduce the level of triglycerides in plasma, and the compounds 3, 4 and 6 also lower the cholesterol level.

The cholesterol and trigylceride values in the control groups vary between 143 and 169 mg/100 ml and between 1.11 and 1.88 $\mu$ mole/ml respectively. These fluctuations are mainly due to seasonal variations.

The food intakes were measured indirectly by observing the change of body weight during the experiment. No difference could be observed between the test groups and control groups.

C. Effect on the level of cholesterol and triglycerides in rat plasma

Male rats of the Sprague-Dawley strain with a level of total cholesterol exceeding 180 mg per 100 ml plasma were used. Each group consisted of 6 rats. The rats were fed a diet supplemented with test substance, 0.1 percent w/w, for 6 days. Blood samples were taken immediately before the start of the experiment and after 6 days. The samples were taken by the morbital eye technique, i.e., out of the ophthalmic venous complex, without sacrificing the animals. The individual rats could thus serve as their own controls.

Diet

The rats were fed commercial rat chow obtained from Astra-Ewos, Sodertalje, Sweden, group and supplemented with the test substances.

Results

The results are collected in Table 2 below.

Table 2

Plasma levels of total cholesterol and triglycerides after administration of test substance.

| Compound No | Total cholesterol in % of initial values (day 0) | Triglycerides in % of initial values (day 0) |
|---|---|---|
| 4 | 81±2 | 61±5 |
| Atromidin | 92±3 | 76±4 |

Evaluation of the results from the biological tests

The purpose of the invention was to bring about substances which are capable of producing a combined lowering of both cholesterol and triglyceride concentrations in blood plasma of mammals. As can be seen from the tests with mice (Table 1) compounds according to the invention are capable of giving such a combined lowering. From the tests with rats (Table 2) it is clear that the tested substance ethyl 2-(4-dibenzofuranyloxy)-2-methylpropionate, on comparison with Atromidin at the same dose, is capable of giving a more pronounced lowering of both cholesterol and triglyceride concentrations. This is in itself advantageous and surprising but most important is that compounds according to the invention are capable of giving a clear decrease of both cholesterol and triglyceride levels and as can be seen from the tests, the clinically used substance Atromidin is capable of giving a decrease of triglyceride level but only a minor decrease of cholesterol level.

It should be emphasized that all compounds of the formula I at page 3 wherein $R^3$ is an alkyl group with

TABLE 1

Plasma levels of total cholesterol and triglycerides after administration of test substance.

| Compound No | Total Cholesterol | | | Triglycerides | | | Average weight gain (g) per animal after 6 days | |
|---|---|---|---|---|---|---|---|---|
| | Test group mg/100 ml plasma | Control Group mg/100 ml plasma | T/C in percent | Test group $\mu$mole/ml plasma | Control group $\mu$mole/ml plasma | T/C in percent | Test group | Control group |
| 1 | 147±3 | 148±6 | 100 | 1.77±0.27 | 1.88±0.08 | 94 | 3 | 3 |
| 2 | 152±7 | 143±3 | 106 | 0.96±0.11 | 1.48±0.10 | 65 | 1 | 3 |
| 3 | 160±5 | 169±3 | 95 | 0.77±0.22 | 1.41±0.06 | 56 | 0 | 3 |
| 4 | 125±6 | 161±3 | 78 | 0.78±0.11 | 1.11±0.18 | 70 | 1 | 2 |
| 5 | 144±5 | 143±3 | 100 | 1.20±0.19 | 1.48±0.10 | 81 | 3 | 3 |
| 6 | 116±3 | 167±6 | 69 | 0.75±0.05 | 1.36±0.06 | 55 | -2 | 2 |
| Atromidin (mean of 10 tests) | 173 | 163 | 106 | 0.63 | 1.34 | 47 | 2 | 3 |

1–3 carbon atoms are rapidly degraded by the esterases resident in the body to the corresponding acids and alcohols. Accordingly the acids of the formula I having $R^3$ = hydrogen are the main form of the compounds of the formula I being resident in the body shortly after the administration. The compounds of the formula I having $R^3$ = hydrogen are mainly responsible for the therapeutic effect, and all esters of the acids of the formula I having R = hydrogen, which are capable of being effectively attacked by esterases resident in the body, will be deesterified to the therapeutically active acids. This means that our invention is not limited to just include those esters of the formula I having $R^3$ = an alkyl group with 1-3 carbon atoms. As a rule most other esters formed from an optional physiologically innoccuous monohydric, dihydric or polyhydric alcohol and an acid of the formula I having $R^3$ = hydrogen will be effectively deesterified in the body to the therapeutically active acid according to the invention.

We claim:

1. A compound selected from the group consisting of compounds of the formula

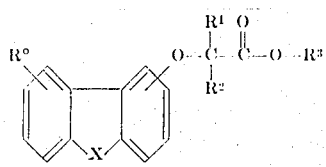

and pharmaceutically acceptable salts thereof, in which formula X is selected from the group consisting of the bivalent radicals —O— and —NH—; $R^0$ is selected from the group consisting of H, F, Cl, Br and $OCH_3$; $R^1$ and $R^2$ are the same or different and selected from the group consisting of H and an alkyl group with 1-3 carbon atoms; $R^3$ is selected from the group consisting of H and an alkyl group with 1-3 carbon atoms; $R^0$ and the side chain containing the radicals $R^1$, $R^2$ and $R^3$ being placed on the same or different benzene ring.

2. A compound according to claim 1, in which formula X is —O— or —NH—; $R^0$ represents H, $R^1$ and $R^2$ are $CH_3$ and $R^3$ is selected from the group consisting of H and $C_2H_5$.

3. A compound according to claim 1, in which formula X represents —O—; $R^0$ represents H, $R^1$ and $R^2$ are $CH_3$ and $R^3$ is selected from the group consisting of H and $C_2H_5$.

4. A compound selected from the group consisting of 2-(4-Dibenzofuranyloxy)-2-methylpropionic acid and pharmaceutically acceptable salts thereof.

5. Ethyl-2-(4-dibenzofuranyloxy)-2-methylpropionate.

6. A compound selected from the group consisting of 2-(3-Dibenzofuranyloxy)-2-methylpropionic acid and pharmaceutically acceptable salts thereof.

7. Ethyl-2-(3-dibenzofuranyloxy)-2-methylpropionate.

8. A compound selected from the group consisting of 2-(2-Dibenzofuranyloxy)-2-methylpropionic acid and pharmaceutically acceptable salts thereof.

9. Ethyl-2-(2-dibenzofuranyloxy)-2-methylpropionate.

10. A compound selected from the group consisting of 2-(1-Dibenzofuranyloxy)-2-methylpropionic acid and pharmaceutically acceptable salts thereof.

11. Ethyl-2-(1-dibenzofuranyloxy)-2-methylpropionate.

12. A compound selected from the group consisting of 2-(2-Carbazolyloxy)-2-methylpropionic acid and pharmaceutically acceptable salts thereof.

13. A compound selected from the group consisting of Ethyl-2-(2-carbazolyloxy)-2-methylpropionate and pharmaceutically acceptable salts thereof.

14. A compound selected from the group consisting of 2-(6-Methoxy-4-dibenzofuranyloxy)-2-methylpropionic acid and pharmaceutically acceptable salts thereof.

15. Ethyl-2-(6-methoxy-4-dibenzofuranyloxy)-2-methylpropionate.

16. A compound selected from the group consisting of 2-(1-Chloro-4-dibenzofuranyloxy)-2-methylpropionic acid and pharmaceutically acceptable salts thereof.

17. Ethyl-2-(1-chloro-4-dibenzofuranyloxy)-2-methylpropionate.

18. A compound selected from the group consisting of 4-Dibenzofuranyloxyacetic acid and pharmaceutically acceptable salts thereof.

19. Ethyl-4-dibenzofuranyloxyacetate.

20. A compound selected from the group consisting of 2-(4-dibenzofuranyloxy)-propionic acid and pharmaceutically acceptable salts thereof.

21. Ethyl-2-(4-dibenzofuranyloxy)-propionate.

22. A compound according to claim 1 in the form of an optically pure isomer.

* * * * *